Patented Mar. 12, 1935

1,994,165

UNITED STATES PATENT OFFICE 1,994,165

COMPOSITE PRODUCT AND METHOD OF MAKING THE SAME

Carl L. Beal, Cuyahoga Falls, Ohio, assignor to American Anode, Inc., Akron, Ohio, a corporation of Delaware No Drawing. Application November 4, 1929, Serial No. 404,875

8 Claims. (Cl. 204—1)

This invention relates to the art of adhering rubber permanently to metal or other rigid articles, and particularly to the adhesion of rubber deposited on such articles from an aqueous dispersion, as by electrophoresis.

The deposition of rubber from aqueous dispersions such as latex has made it possible for the first time to coat articles of the most varied and complicated shapes with an adherent layer of rubber. However, the rubber alone will not adhere satisfactorily to smooth surfaces such as metal, glass, etc. On the other hand many of the adhesives which can be employed in connection with masticated and calendered rubber present considerable difficulties when employed together with aqueous dispersions. For example, adhesives in the form of a solution in an organic solvent cannot be employed in conjunction with electrodeposition because the adhesive layer insulates the base upon which it is applied, and prevents the passage of the electric current.

The adhesives employed for securing electrodeposited rubber to the base are therefore preferably employed in the form of aqueous dispersions similar to the rubber dispersion or latex from which the rubber is deposited. Many adhesives, however, are very difficult to disperse in aqueous media, and do not always give entirely satisfactory results when employed in the forms of dispersions, possibly because the aqueous colloids such as gelatine, casein, soap, etc., which are necessary for the preparation of a stable dispersion, modify the properties of the product derived from the dispersion. This is particularly true of the tough, heat-plastic rubber isomers, such as the balata-like product prepared by the reaction of rubber with sulphonic acids, and described by Harry L. Fisher, in United States Patent No. 1,605,180, dated November 2, 1926. These rubber isomers—hereafter generically termed "tough, heat-plastic rubber isomers"— may also be prepared by other methods than that described in the above-mentioned patent, but possess the common properties of being relatively hard and tough at room temperature, but plastic and moldable at elevated temperatures; of containing carbon and hydrogen in the same ratio as rubber, but of being less unsaturated chemically than rubber.

This invention in its preferred form consists in mixing a tough, heat-plastic rubber isomer with a resinous substance, dispersing the mixture in an aqueous medium, and employing the dispersion as an adhesive for electrodeposited rubber. The resinous substance may be ordinary wood rosin, ester gum, copal, shellac, or other similar solid which is miscible with the rubber isomer. The best results are obtained when fairly large proportions of the resinous substance are employed, say from 30 to 100% of the weight of the rubber isomer. The mixture is soft enough to be masticated quite readily in a hot mixer and is readily dispersed in water. The dispersion, when applied to metal, adheres very firmly after drying, and permanently bonds the rubber, which is subsequently applied thereon, to the metal base.

Although the best results are secured by mixing the rubber isomer and the resinous substance before they are dispersed, it may be found useful to disperse them separately and mix the dispersion. The two constituents are deposited from the mixed dispersion intimately associated with one another, and give the same superior adhesion of electrodeposited rubber as the dispersions of the mixed substances.

The dispersion containing the rubber isomer and the resinous materials is preferably applied to the metal base by electrodeposition. In any case it should not be allowed to dry completely before the rubber is electrodeposited, for the dried dispersion has only a very slight electrical conductivity, insufficient for the passage of the current required for electrodeposition.

As a specific example of one manner of carrying out this invention, 100 parts by weight of a tough, heat-plastic, balata-like rubber isomer are warmed in an oven to soften them and are then placed in a steam jacketed internal mixer and masticated until homogeneous. 50 parts of ester gum are added and thoroughly mixed with the rubber isomer, followed by 4 parts of potassium oleate made into a paste with a small quantity of water. After the soap is thoroughly incorporated, 3 parts of gum arabic dissolved in 50 parts of water are slowly added to the mixture, the mixer being kept covered to prevent evaporation of the water. 4 parts of casein are swelled in twice their volume of hot water and concentrated ammonia is added to render the casein soluble. The product, which should be a thick paste, is then likewise mixed into the dispersion in the internal mixer. The first portions of gum arabic solution are dispersed in the adhesive by the masticatory action of the internal mixer, but as the quantity is increased the mixture becomes softer and more stringy, and finally, as the casein is added, it breaks and the phases are inverted. That is, the adhesive, which at first is a continuous mass enclosing droplets of water, breaks into globules, while the water droplets unite into a continuous phase in which the adhesive substance is dispersed. After this inversion is complete, the dispersion is diluted until it contains about 25% of dispersed adhesive material.

The article which is to be coated with rubber, say a tool handle of iron or steel, is preferably coated with zinc by electroplating or galvanizing, although the rubber may be deposited directly on the iron if the discoloration of the rubber by iron oxide is not objectionable. The zinc coated article is immersed in the dispersion of the adhesive, and connected to the positive terminal of a source of direct current at a potential of about 60 volts, the negative terminal being connected to a cathode of suitable shape also immersed in the dispersion. The cathode may be of any convenient metal, for example, of iron, zinc, lead, or tin. Copper is to be avoided because of the bad effect of copper compounds on rubber. A current of about 0.1 ampere per square inch of surface of the article is then passed for some 20 seconds. The article is then removed from the dispersion and is found to be coated with a thin but coherent layer of the adhesive, the layer still containing a sufficient proportion of water to preserve its electrical conductivity so that rubber can be electro-deposited on it.

The rubber is electrodeposited from natural latex or from an artificial dispersion of rubber, reclaimed rubber or other similar product, which may if desired contain dispersions of pigments, fillers, vulcanizing agents, etc. For example, the quantity of ammonia-preserved natural latex of about 30% rubber concentration, from which the greater part of the ammonia has been removed by aeration, corresponding to 100 parts of dry rubber, is mixed with dispersions containing 3 parts of sulphur, 3 parts of zinc stearate, 0.5 parts organic accelerator, and 1 part of lampblack. The article coated with the adhesive is immersed in the latex mix and a current of the same strength as employed before is passed between the article and the cathode until the desired thickness of rubber is deposited. A coating $\frac{1}{16}$" in thickness may be built up in about five minutes. Because of the heavy currents employed and the relatively long time required, large volumes of hydrogen are given off at the cathode, tending to form a foam at the surface of the latex mix. It is therefore preferred to separate the cathodes from the main body of the latex either by screens of fine fabric, through which the foam cannot penetrate, or by porous diaphragms.

The rubber coating on the metal article is dried and is vulcanized in the usual manner, for example, in open steam at a pressure of 30 pounds per square inch for twenty minutes, the articles preferably being cooled before the pressure is reduced, to eliminate all danger of blisters forming in the rubber. The vulcanized rubber coating is then found to be united to the metal so firmly that the rubber itself is destroyed before it can be detached from the metal.

Although a preferred method of carrying out this invention has been described in considerable detail, it is to be understood that the invention is not limited thereto, for the process described is susceptible of numerous modifications and variations in its several parts, without exceeding the scope of this invention or of the appended claims.

I claim:

1. The method of coating metal articles with an adherent layer of rubber which comprises electrodepositing on the said articles a thin layer from an aqueous dispersion comprising a tough, heat-plastic rubber isomer, and thereafter electrodepositing a layer of rubber from an aqueous dispersion of rubber.

2. The method of coating metal articles with an adherent layer of rubber which comprises electrodepositing on the said articles a thin layer from an aqueous dispersion comprising a tough, heat-plastic rubber isomer and a resinous solid, and thereafter electrodepositing a layer of rubber from an aqueous dispersion of rubber.

3. The method of coating metal articles with an adherent layer of rubber which comprises electrodepositing on the said articles a thin layer from an aqueous dispersion comprising a tough, heat-plastic rubber isomer and ester gum, and thereafter electrodepositing a layer of rubber from an aqueous dispersion of rubber.

4. The method of coating metal articles with an adherent layer of rubber which comprises electrodepositing on the said articles a thin layer from an aqueous dispersion comprising a tough, heat-plastic rubber isomer, thereafter electrodepositing thereon a layer of rubber from an aqueous dispersion of rubber and drying the deposit.

5. The method of coating metal articles with an adherent layer of rubber which comprises electrodepositing on the said articles a thin layer from an aqueous dispersion comprising a tough, heat-plastic rubber isomer, thereafter electrodepositing thereon a layer of rubber from a vulcanizable aqueous dispersion of rubber, and drying and vulcanizing the deposit.

6. The method of coating metal articles with an aqueous dispersion of rubber which comprises dispersing a tough, heat-plastic rubber isomer in an aqueous medium, electrodepositing a thin layer from the dispersion on the said articles, and thereafter electrodepositing thereon a layer of rubber from an aqueous dispersion of rubber.

7. A composite product comprising a metal base, a thin layer of an adhesive comprising a tough, heat-plastic rubber isomer and a substantial proportion of a resinous solid, and a layer of electrodeposited rubber, the whole being firmly bonded together.

8. A composite product comprising a metal base, a thin layer of an adhesive comprising a tough, heat-plastic rubber isomer and a substantial proportion of a resinous solid, and a layer of vulcanized electrodeposited rubber, the whole being firmly bonded together.

CARL L. BEAL.